US012809666B2

(12) United States Patent
Park et al.

(10) Patent No.: US 12,809,666 B2
(45) Date of Patent: Nov. 24, 2026

(54) METHOD AND APPARATUS FOR SCHEDULING TASKS IN MULTI-CORE PROCESSOR

(71) Applicant: Samsung Electronics Co., Ltd., Suwon-si (KR)

(72) Inventors: Bumgyu Park, Suwon-si (KR); Jonglae Park, Anyang-si (KR); Choonghoon Park, Seoul (KR); Donghee Han, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 784 days.

(21) Appl. No.: 17/866,923

(22) Filed: Jul. 18, 2022

(65) Prior Publication Data

US 2023/0043222 A1 Feb. 9, 2023

(30) Foreign Application Priority Data

Aug. 5, 2021 (KR) ........................ 10-2021-0103432

(51) Int. Cl.

*G06F 9/48* (2006.01)
*G06F 9/445* (2018.01)
*G06F 9/50* (2006.01)

(52) U.S. Cl.

CPC ........ *G06F 9/4881* (2013.01); *G06F 9/44505* (2013.01); *G06F 9/505* (2013.01)

(58) Field of Classification Search

CPC .... G06F 9/4881; G06F 9/44505; G06F 9/505; G06F 9/485; G06F 9/5027; G06F 9/5066; Y02D 10/00

See application file for complete search history.

(56) References Cited

U.S. PATENT DOCUMENTS

| | | | | |
|---|---|---|---|---|
| 6,205,150 | B1 | 3/2001 | Ruszczyk | |
| 7,020,797 | B2 | 3/2006 | Patil | |
| 7,421,694 | B2 | 9/2008 | Gosalia et al. | |
| 7,433,953 | B1 | 10/2008 | Kappler et al. | |
| 8,156,110 | B1 | 4/2012 | Luo et al. | |
| 8,171,115 | B2 | 5/2012 | Hamilton et al. | |
| 8,327,363 | B2 | 12/2012 | Gopalan et al. | |
| 8,527,645 | B1 * | 9/2013 | Proffit | G06F 9/5027 718/103 |
| 8,799,913 | B2 | 8/2014 | Yoo et al. | |
| 9,384,050 | B2 | 7/2016 | Yamauchi et al. | |

(Continued)

FOREIGN PATENT DOCUMENTS

| | | |
|---|---|---|
| CN | 104540234 A | 4/2015 |
| KR | 101644800 B1 | 8/2016 |

*Primary Examiner* — Aimee Li

*Assistant Examiner* — An-An Ngoc Nguyen

(74) *Attorney, Agent, or Firm* — Harness, Dickey & Pierce, P.L.C.

(57) ABSTRACT

An apparatus includes a plurality of processing cores, and a memory including a plurality of task queues corresponding to the plurality of processing cores, respectively, wherein at least one processing core of the plurality of processing cores is configured, by executing a scheduler, to determine execution of task rescheduling, based on states of the plurality of processing cores, tasks stored in the plurality of task queues, and at least one reference value, and, when the task rescheduling is executed, move a first task stored in a first task queue to a second task queue.

20 Claims, 10 Drawing Sheets

(56) References Cited

U.S. PATENT DOCUMENTS

| | | | | |
|---|---|---|---|---|
| 9,639,396 | B2 | 5/2017 | Pho et al. | |
| 9,747,659 | B2 | 8/2017 | Banerjee et al. | |
| 10,423,451 | B2 * | 9/2019 | Fahrig | G06F 9/526 |
| 10,754,706 | B1 * | 8/2020 | Mo | G06F 9/5038 |
| 10,871,988 | B1 | 12/2020 | Gao et al. | |
| 2009/0019449 | A1 * | 1/2009 | Choi | G06F 9/5088 718/105 |
| 2010/0205607 | A1 * | 8/2010 | Shivanna | G06F 11/0715 718/103 |
| 2011/0078700 | A1 * | 3/2011 | Blackburn | G06F 9/505 718/105 |
| 2012/0180061 | A1 * | 7/2012 | Rao | G06F 9/5088 718/104 |
| 2013/0047164 | A1 * | 2/2013 | Ujibashi | G06F 9/4881 718/104 |
| 2015/0324234 | A1 * | 11/2015 | Chang | G06F 9/5033 718/104 |
| 2016/0011907 | A1 * | 1/2016 | Moyer | G06F 9/4843 718/104 |
| 2017/0083382 | A1 * | 3/2017 | LeBeane | G06F 1/3293 |
| 2017/0255490 | A1 * | 9/2017 | Aberg | G06F 9/50 |
| 2018/0095522 | A1 * | 4/2018 | Huang | G06F 11/3055 |
| 2018/0157527 | A1 * | 6/2018 | Tung | G06F 9/5088 |
| 2019/0041962 | A1 * | 2/2019 | Ananthakrishnan | G06F 1/324 |
| 2020/0241917 | A1 * | 7/2020 | Chen | G06F 9/3836 |
| 2021/0157635 | A1 * | 5/2021 | Rinaldi | G06F 13/20 |
| 2021/0182180 | A1 * | 6/2021 | Luecke | G06N 20/00 |
| 2021/0397526 | A1 * | 12/2021 | Schmitz | G06F 9/45508 |

* cited by examiner

METHOD AND APPARATUS FOR SCHEDULING TASKS IN MULTI-CORE PROCESSOR

CROSS-REFERENCE TO RELATED APPLICATION

This application is based on and claims priority under 35 U.S.C. § 119 to Korean Patent Application No. 10-2021-0103432, filed on Aug. 5, 2021, in the Korean Intellectual Property Office, the disclosure of which is incorporated by reference herein in its entirety.

BACKGROUND

The inventive concepts relate to task scheduling, and more particularly, to a method and an apparatus for performing task scheduling in a multi-core processor.

As a programmable component, a processor may perform various functions by executing instructions. The processor may include a plurality of processing cores for higher performance, and each of the plurality of processing cores may independently execute instructions. A task including a series of instructions may be assigned to a processing core, and the processing core may sequentially perform assigned tasks. In a system including the processor, tasks having various attributes may be generated, and the processor may include different types of processing cores. Thus, more efficiently assigning tasks to the plurality of processing cores, that is, scheduling tasks, may be advantageous for the performance and/or efficiency of the system.

SUMMARY

The inventive concepts provide a method and an apparatus for rescheduling scheduled tasks in early stages.

According to an aspect of the inventive concepts, there is provided an apparatus including a plurality of processing cores, and a memory including a plurality of task queues corresponding to the plurality of processing cores, respectively, wherein at least one processing core of the plurality of processing cores is configured, by executing a scheduler, to determine execution of task rescheduling, based on states of the plurality of processing cores, tasks stored in the plurality of task queues, and at least one reference value, and, when the task rescheduling is executed, move a first task stored in a first task queue to a second task queue.

According to another aspect of the inventive concepts, there is provided a method, performed by an apparatus including a plurality of processing cores, of scheduling tasks, the method including determining execution of task rescheduling, based on states of the plurality of processing cores and tasks stored in a plurality of task queues corresponding to the plurality of processing cores, respectively, and executing the task rescheduling, when it is determined to execute the task rescheduling, wherein the execution of the task rescheduling includes moving a first task stored in a first task queue to a second task queue.

According to another aspect of the inventive concepts, there is provided a non-transitory computer-readable storage medium storing instructions that, when executed by at least one processing core of a plurality of processing cores, cause the at least one processing core to execute task scheduling, wherein the task scheduling includes determining execution of task rescheduling based on states of the plurality of processing cores and tasks stored in a plurality of task queues corresponding to the plurality of processing cores, respectively, and executing the task rescheduling, when it is determined to execute the task rescheduling, wherein the execution of the task rescheduling includes moving a first task stored in a first task queue to a second task queue.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Figure 1:
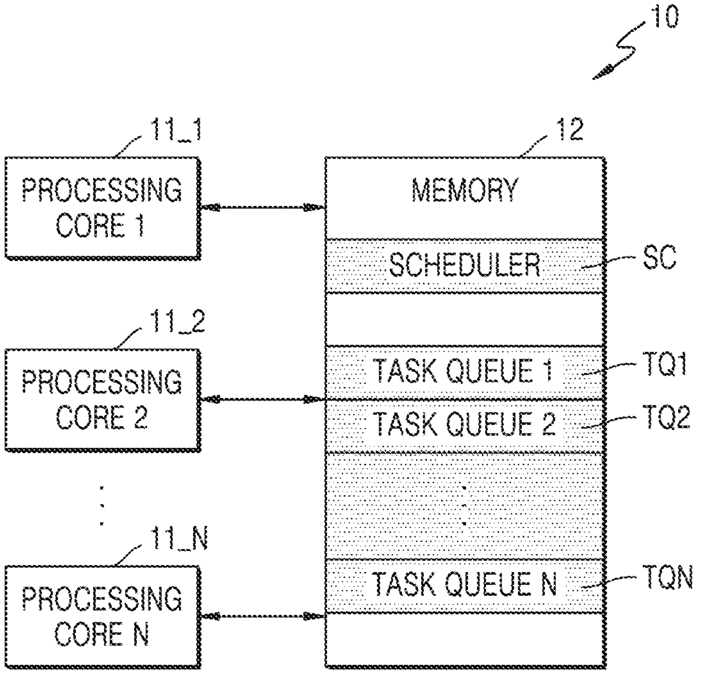
FIG. 1 is a block diagram of a system according to example embodiments.

FIG. 1 is a block diagram of a system 10 according to example embodiments. The system 10 may refer to an arbitrary system including a plurality of processing cores and a memory. For example, the system 10 may include: a computing system, such as a personal computer (PC), a mobile phone, a server, etc.; a module in which a plurality of processing cores and a memory are mounted on a board as separate packages; or a system-on-chip (SoC) in which a plurality of processing cores and a memory are embedded in one chip. As illustrated in FIG. 1, the system 10 may include first through Nth processing cores 11_1 through 11_N and a memory 12 (N is an integer greater than 1). The first through Nth processing cores 11_1 through 11_N may be generally referred to as a multi-core processor, or the system 10 including the first through Nth processing cores 11_1 through 11_N and the memory 12 may be referred to as a multi-core processor.

The first through Nth processing cores 11_1 through 11_N may communicate with the memory 12 and each of the first through Nth processing cores 11_1 through 11_N may independently execute instructions. In some example embodiments, each of the first through Nth processing cores 11_1 through 11_N may execute a task stored in a task queue corresponding thereto from among first through Nth task queues TQ1 through TQN included in the memory 12. For example, the second processing core 11_2 may execute the task stored in the second task queue TQ2 included in the memory 12. The task may include a series of instructions and may refer to a unit of a job that a scheduler SC, to be described below, assigns to the first through Nth processing cores 11_1 through 11_N. The processing core may be arbitrary hardware capable of independently executing instructions and may be referred to as a central processing unit (CPU), a processor core, a core, etc.

In some example embodiments, the first through Nth processing cores 11_1 through 11_N may be homogeneous processing cores. For example, each of the first through Nth processing cores 11_1 through 11_N may provide the same performance (for example, execution time and power consumption) when executing the same task. In some example embodiments, the first through Nth processing cores 11_1 through 11_N may be heterogeneous processing cores. For example, the first through Nth processing cores 11_1 through 11_N may include processing cores providing relatively higher performance and/or power consumption (may be referred to as big cores herein) and processing cores providing relatively lower performance and/or power consumption (may be referred to as little cores herein). Accordingly, each of the heterogeneous processing cores may provide different performance (for example, execution time and power consumption) when performing the same task.

The memory 12 may be accessed by the first through Nth processing cores 11_1 through 11_N and may store a software element executable by the first through Nth processing cores 11_1 through 11_N. For example, as illustrated in FIG. 1, the memory 12 may store the scheduler SC and may include the first through Nth tasks queues TQ1 through TQN storing the tasks. The software element may include, but is not limited to, a software component, a program, an application, a computer program, an application program, a system program, a software development program, a machine program, an operating system (OS), software, middleware, firmware, a software module, a routine, a sub-routine, a function, a method, a procedure, a software interface, an application program interface (API), a command set, computing code, computer code, a code segment, a computer code segment, a word, a value, a symbol, or a combination of at least two thereof.

The memory 12 may store information and may be arbitrary hardware accessible by the first through Nth processing cores 11_1 through 11_N. For example, the memory 12 may include read-only memory (ROM), random-access memory (RAM), dynamic RAM (DRAM), double-data-rate DRAM (DDR-DRAM), synchronous DRAM (SDRAM), static RAM (SRAM), magneto-resistive RAM (MRAM), programmable ROM (PROM), erasable PROM (EPROM), electrically EPROM (EEPROM), a flash memory, a polymer memory, a phase-change memory, a ferroelectric memory, a silicon-oxide-nitride-oxide-silicon (SONOS) memory, a magnetic card/disk, an optical card/disk, or a combination of at least two thereof.

The scheduler SC may be executed by at least one of the first through Nth processing cores 11_1 through 11_N. For example, as described below with reference to FIG. 3, the scheduler SC may be periodically and/or non-periodically executed by at least one of the first through Nth processing cores 11_1 through 11_N. Herein, the processing core performing an operation by executing the scheduler SC may be simply stated as the scheduler SC operating. The scheduler SC may assign tasks to the first through Nth processing cores 11_1 through 11_N. For example, the scheduler SC may select a task to be executed by the second processing core 11_2 and may store the selected task in the second task queue TQ2. Accordingly, tasks to be executed by the first through Nth processing cores 11_1 through 11_N may be determined by the scheduler SC, and the performance and/or efficiency of the system 10 may depend on the scheduler SC.

In some example embodiments, the scheduler SC may be included in a kernel. For example, an OS may be executed by the system 10, and applications may be executed on the OS. The scheduler SC may schedule tasks generated in an upper layer (for example, a framework or an application) and/or tasks generated in the kernel in which the scheduler SC is included (for example, tasks generated by a device driver).

Each of the first through Nth task queues TQ1 through TQN may store the tasks (or information about the tasks) to be executed by the processing core corresponding thereto. For example, the second task queue TQ2 may store at least one task assigned to the second processing core 11_2 by the scheduler SC and may be accessed by the second processing core 11_2. Areas of the memory 12 may be assigned to the first through Nth task queues TQ1 through TQN, and the first through Nth processing cores 11_1 through 11_N may access the areas of the memory 12, the areas being assigned to the first through Nth task queues TQ1 through TQN, in order to execute the tasks or schedule the tasks by executing the scheduler SC. In some example embodiments, unlike what is illustrated in FIG. 1, the first through Nth task queues TQ1 through TQN may not be continually assigned in the memory 12. Herein, a task queue may be simply referred to as a queue.

In some example embodiments, the scheduler SC may re-assign the scheduled tasks, that is, the tasks stored in the first through Nth tasks queues TQ1 through TQN, to the first through Nth processing cores 11_1 through 11_N. For example, the re-assignment of the tasks may be performed by storing the tasks to be re-assigned, in the first through Nth tasks queues TQ1 through TQN corresponding to the first through Nth processing cores 11_1 through 11_N, respectively. Like this, the re-assignment of the tasks (may be referred to as active tasks herein) stored in the task queues may be referred to as rescheduling or task rescheduling, and the scheduler SC may perform rescheduling in order to increase the performance and/or efficiency of the system 10. The scheduler SC may perform the rescheduling not only based on states of the first through Nth processing cores 11_1 through 11_N, but also based on attributes (for example, loads, complexities, or sizes) of the tasks stored in the first through Nth tasks queues TQ1 through TQN, that is, the active tasks, and thus, degradation of the performance and/or efficiency of the system 10, due to the tasks that are not optimally scheduled, may be predicted in early stages. Also, based on the predicted degradation of the performance and/or efficiency, the scheduler SC may reschedule the tasks in advance, and thus, errors of the system 10 may be reduced or prevented, and the performance and/or efficiency of the system 10 may be improved. For example, it may be probable that tasks may not be optimally scheduled in a non-deterministic system, which processes unpredictable user inputs, such as a mobile phone, rather than in a deterministic system, which mainly processes regular tasks, such as a server, and thus, task rescheduling may significantly improve the performance and/or efficiency of the non-deterministic system. Hereinafter, example embodiments will be described mainly based on a system including two processing cores, but it shall be understood that the inventive concepts are not limited thereto.

In some example embodiments, the scheduler SC may be stored in a non-transitory computer-readable storage medium. The term "computer-readable medium" may refer to an arbitrary type of medium which may be accessed by a computer, such as ROM, RAM, a hard disk drive, a compact disk (CD), a digital versatile disc (DVD), or other types of memories. The "non-transitory" computer-readable medium may exclude wired, wireless, optical, or other communication links exchanging transitory electricity or other signals and may include a medium in which data may be permanently stored or a medium in which data may be stored and overwritten later, such as a re-writable optical disk or an erasable memory device.

Figure 2:
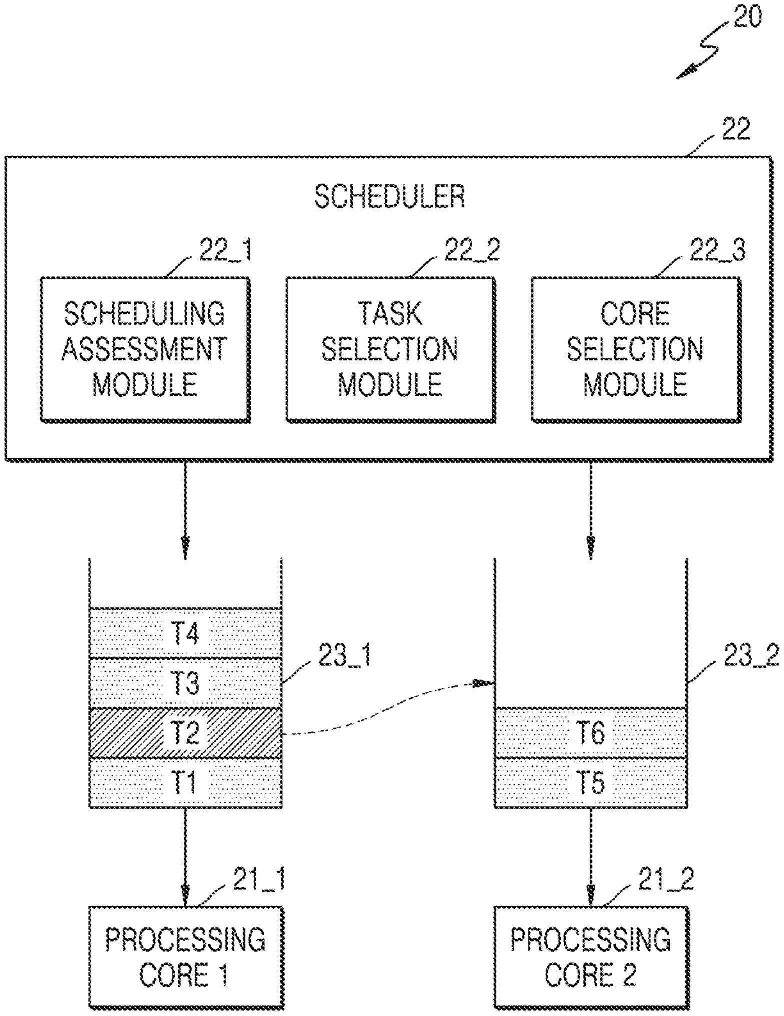
FIG. 2 is a block diagram of an example of scheduling of a system, according to example embodiments.

FIG. 2 is a block diagram of an example of scheduling of a system 20, according to example embodiments. As illustrated in FIG. 2, the system 20 may include a scheduler 22, a first task queue 23_1, a second task queue 23_2, a first processing core 21_1, and a second processing core 21_2. As described above with reference to FIG. 1, the scheduler 22 may be stored in a memory and may be executed by the first processing core 21_1 and/or the second processing core 21_2. Also, as described above with reference to FIG. 1, the first task queue 23_1 and the second task queue 23_2 may be included in the memory and may be accessed by the first processing core 21_1 and/or the second processing core 21_2.

Referring to FIG. 2, the scheduler 22 may include a scheduling assessment module 22_1, a task selection module 22_2, and/or a core selection module 22_3. Each of the scheduling assessment module 22_1, the task selection module 22_2, and the core selection module 22_3 may be a software element and may be executed by the first processing core 21_1 and/or the second processing core 21_2 executing the scheduler 22. Hereinafter, the first processing core 21_1 and/or the second processing core 21_2 performing an operation by executing each of the scheduling assessment module 22_1, the task selection module 22_2, and the core selection module 22_3 may be simply stated as each of the scheduling assessment module 22_1, the task selection module 22_2, and the core selection module 22_3 performing an operation.

The scheduling assessment module 22_1 may assess a currently scheduled state. For example, the scheduling assessment module 22_1 may assess the currently scheduled state, that is, a result of previous scheduling, based on states of the first processing core 21_1 and the second processing core 21_2, attributes of first through fourth tasks T1 through T4 stored in the first task queue 23_1, and attributes of fifth and sixth tasks T5 and T6 stored in the second task queue 23_2. The scheduling assessment module 22_1 may assess the currently scheduled state based on various parameter values indicating the states of the first processing core 21_1 and the second processing core 21_2 and the attributes of the first through sixth tasks T1 through T6. Examples of assessing the currently scheduled state by the scheduling assessment module 22_1 are described below with reference to FIGS. 4A through 9.

The task selection module 22_2 may select a task to be rescheduled. For example, the scheduling assessment module 22_1 may determine whether or not to perform rescheduling based on a result of the assessment of the currently scheduled state, and when it is determined to perform the rescheduling, the task selection module 22_2 may select the task to be rescheduled. As illustrated in FIG. 2, the task selection module 22_2 may select the second task T2 from among the first through fourth tasks T1 through T4 stored in the first task queue 23_1.

The task selection module 22_2 may select the task to be rescheduled based on the attributes of the tasks stored in the task queues. In some example embodiments, the task selection module 22_2 may select the task based on at least one of the importance of the task, a waiting time of the task in the task queue, a load (or a complexity) of the task, and a size of the task. For example, when it is determined by the scheduling assessment module 22_1 that it is required to improve the performance and/or efficiency of the first processing core 21_1, the task selection module 22_2 may select at least one task from among the first through fourth tasks T1 through T4 stored in the first task queue 23_1. In some example embodiments, the task selection module 22_2 may select the second task T2 having a higher importance (or priority) from among the first through fourth tasks T1 through T4. In some example embodiments, the task selection module 22_2 may select the second task T2 having a long waiting time from among the first through fourth tasks T1 through T4. In some example embodiments, the task selection module 22_2 may select the second task T2 having a large load from among the first through fourth tasks T1 through T4. In some example embodiments, the task selection module 22_2 may identify attributes of the tasks, related to the cause of rescheduling determined by the scheduling assessment module 22_1, and may select the second task T2 based on the identified attributes of the first through fourth tasks T1 through T4.

In some example embodiments, a task generated in an upper layer with respect to the scheduler SC, that is, a task generated in an upper layer with respect to the kernel, may have a priority designated based on the importance. For example, as described below with reference to FIG. 8, the task may be included in one of a top-app group having the highest priority, a background group having the lowest priority, and a foreground group having a priority between those of the top-app group and the background group. In some example embodiments, the priority of the task may be designated based on the importance of the task, in the layer of the scheduler, that is, the kernel layer. For example, a Linux kernel may divide tasks into a real time (RT) task and a normal task, and the RT task may have a higher priority than the normal task.

The core selection module 22_3 may select a processing core to execute the task selected by the task selection module 22_2. For example, as illustrated by dashed arrows of FIG. 2, the core selection module 22_3 may select the second processing core 21_2, and the second task T2 selected by the task selection module 22_2 may be moved from the first task queue 23_1 to the second task queue 23_2 corresponding to the second processing core 21_2. In some example embodiments, unlike what is illustrated in FIG. 2, the core selection module 22_3 may select the first processing core 21_1, and when the system 20 includes three or more processing cores, the core selection module 22_3 may select a different processing core from the first processing core 21_1 and the second processing core 21_2. In some example embodiments, the core selection module 22_3 may select a core based on energy aware scheduling (EAS) and/or completely fair scheduler (CFS).

Figure 3:
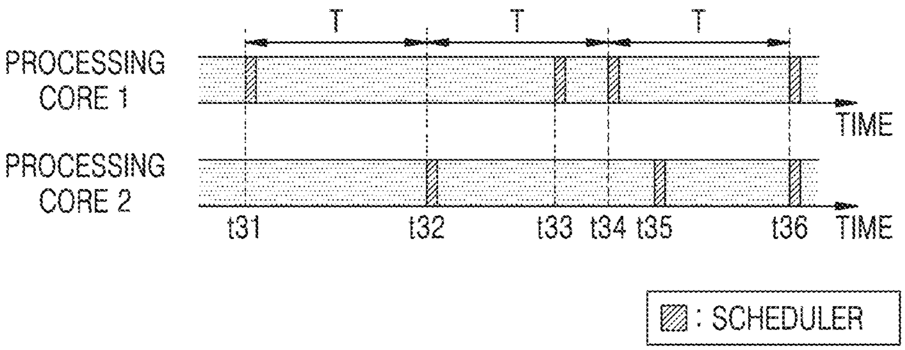
FIG. 3 is a timing diagram of an operation of a scheduler, according to example embodiments.

FIG. 3 is a timing diagram of an operation of a scheduler, according to example embodiments. As described above with reference to FIGS. 1 and 2, the scheduler may be executed by at least one of a plurality of processing cores and may reschedule active tasks by being executed by the at least one processing core. Hereinafter, FIG. 3 is described with reference to FIG. 2.

In some example embodiments, the scheduler 22 may be periodically executed. For example, as illustrated in FIG. 3, the scheduler 22 may be executed by the first processing core 21_1 and/or the second processing core 21_2 at every period T. Referring to FIG. 3, the first processing core 21_1 may execute the scheduler 22 at a time t31 and a time 34, the second processing core 21_2 may execute the scheduler 22 at a time 32, and the first processing core 21_1 and the second processing core 21_2 may execute the scheduler 22 at a time t36. In some example embodiments, an interrupt may periodically (for example, at every period T) and/or non-periodically occur, and the first processing core 21_1 and/or the second processing core 21_2 may execute the scheduler 22 in response to the interrupt.

In some example embodiments, while the scheduler 22 may be basically periodically executed, the scheduler 22 may be executed in response to a non-periodic event. For example, the scheduler 22 may be executed when a predefined (or predetermined or desired) event occurs. The event may be an arbitrary event which may cause rescheduling of the active tasks and may include, for example, an event in which a new task is generated. Referring to FIG. 3, in response to a generation of a new task, the first processing core 21_1 may execute the scheduler 22 at a time t33, and in response to a generation of a new task, the second processing core 21_2 may execute the scheduler 22 at a time t35. In some example embodiments, an interrupt may occur when an event is generated, and the first processing core 21_1 and/or the second processing core 21_2 may execute the scheduler 22 in response to the interrupt. In some example embodiments, unlike what is illustrated in FIG. 3, the scheduler 22 may be only periodically executed. Also, in some example embodiments, unlike what is illustrated in FIG. 3, the scheduler 22 may be only non-periodically executed.

Figure 4A:
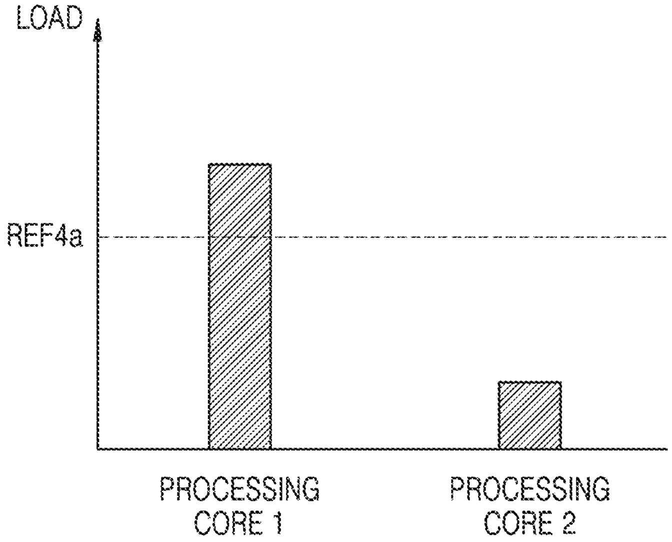
FIGS. 4A and 4B are graphs for describing a scheduling assessment according to example embodiments.
Figure 4B:
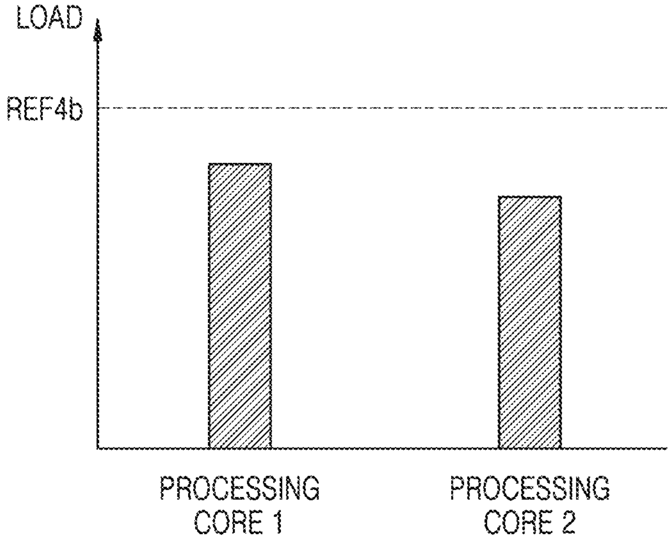

FIGS. 4A and 4B are graphs for describing a scheduling assessment according to example embodiments. In detail, graphs of FIGS. 4A and 4B illustrate loads of the first processing core 21_1 and loads of the second processing core 21_2 at different time points. Hereinafter, FIGS. 4A and 4B are described with reference to FIG. 2.

In some example embodiments, the scheduler 22 may monitor loads of processing cores and may determine whether or not to execute rescheduling based on the loads of the processing cores. For example, as illustrated in FIG. 4A, while the load of the second processing core 21_2 may be less than a reference value REF4*a*, the load of the first processing core 21_1 may be greater than the reference value REF4*a*, and thus, the scheduler 22 may determine to execute the rescheduling. However, as illustrated in FIG. 4B, the loads of both of the first processing core 21_1 and the second processing core 21_2 may be less than the reference value REF4*b*, and the scheduler 22 may not execute the rescheduling. In some example embodiments, the scheduler 22 may determine whether or not to perform rescheduling by comparing loads of processing cores, rather than using an additional reference value.

In some example embodiments, the reference value compared with the loads of the processing cores may be changed according to a distribution of the loads of the processing cores. For example, as illustrated in FIG. 4A, when a difference between the load of the first processing core 21_1 and the load of the second processing core 21_2 is high, that is, when the load is concentrated in the first processing core 21_1, the reference value REF4*a* may have a relatively lower value to resolve the load of the first processing core 21_1. However, as illustrated in FIG. 4B, when the load of the first processing core 21_1 and the load of the second processing core 21_2 are similar to each other, that is, the loads of the first processing core 21_1 and the second processing core 21_2 are even, the reference value REF4*b* may have a relatively higher value (REF4*b*>REF4*a*) in order to reduce or prevent frequent rescheduling. The scheduler 22 may monitor the distribution of the loads of the first processing core 21_1 and the second processing core 21_2 and may determine the reference value based on the monitored distribution.

Figure 5:
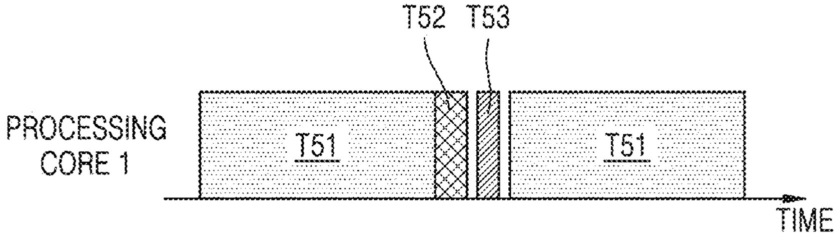
FIG. 5 is a timing diagram for describing a scheduling assessment according to example embodiments.

FIG. 5 is a timing diagram for describing a scheduling assessment according to example embodiments. In detail, the timing diagram of FIG. 5 illustrates tasks executed by the first processing core 21_1 according to a time lapse. Hereinafter, FIG. 5 is described with reference to FIG. 2.

Referring to FIG. 5, the first processing core 21_1 may execute first through third tasks T51 through T53, and while the first task T51 may have a relatively higher priority like an RT task, the second task T52 and the third task T53 may have a relatively lower priority like a normal task. As illustrated in FIG. 5, an occupation rate of the first task T51 with respect to the first processing core 21_1 may be high, and thus, not only executions of the second task T52 and the third task T53, but also executions of other tasks stored in a first task queue 23_1 may be delayed or become impossible. In particular, tasks having lower priorities losing execution opportunities due to execution of a task having a higher priority may be referred to as a starvation state, and this starvation state may cause an error in the system 20.

In some example embodiments, the scheduler 22 may monitor the tasks executed by the processing cores and may determine whether or not to execute rescheduling based on the tasks executed by the processing cores. For example, when an occupation rate of a particular task (for example, a higher priority) with respect to a processing core is equal to or greater than a reference value, the scheduler 22 may determine to execute the rescheduling, and a situation like a starvation state of other tasks may be predicted and reduced or prevented in early stages.

Figure 6A:
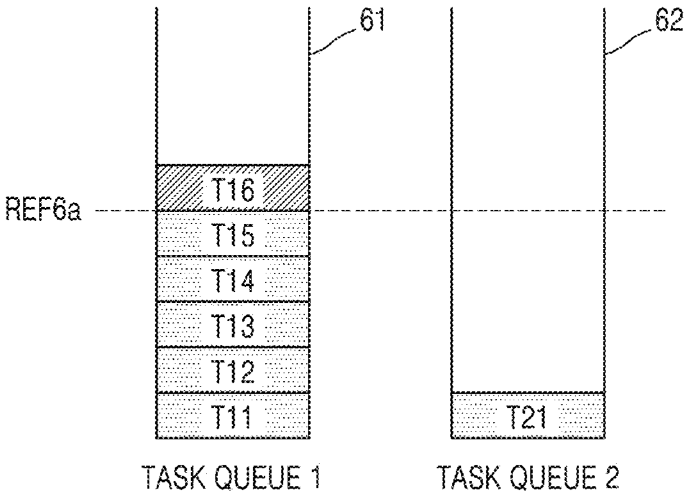
FIGS. 6A and 6B are diagrams for describing a scheduling assessment according to example embodiments.
Figure 6B:
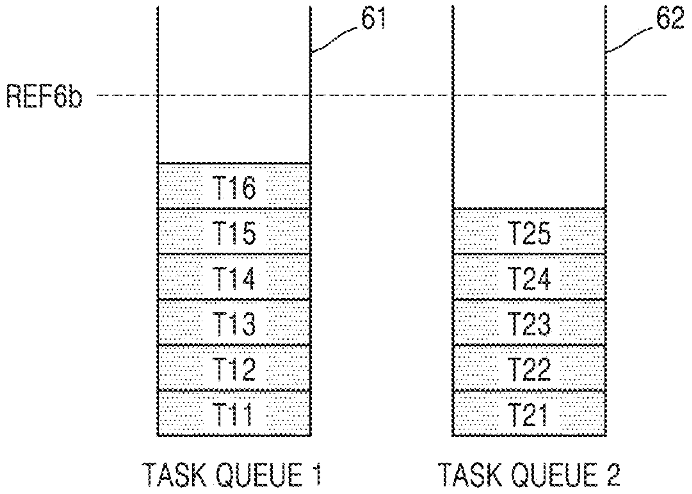

FIGS. 6A and 6B are diagrams for describing a scheduling assessment according to example embodiments. In detail, FIGS. 6A and 6B illustrate first task queues and second task queues at different time points.

In some example embodiments, the scheduler 22 may monitor tasks stored in a task queue and may determine whether or not to execute rescheduling based on the number of tasks stored in the task queue. For example, as illustrated in FIG. 6A, when, while a second task queue 62 stores one task T21, which is less than a reference value REF6*a*, a first task queue 61 stores six tasks T11 through T16, which are greater than the reference value REF6*a*, the scheduler 22 may determine to execute the rescheduling. However, as illustrated in FIG. 6B, when the first task queue 61 stores the six tasks T11 through T16, which are less than a reference value REFb, and the second task queue 62 also stores five tasks T21 through T25, which are less than the reference value REF6*b*, the scheduler may determine not to execute the rescheduling.

In some example embodiments, the reference value compared with the number of tasks stored in the task queue may be changed according to a distribution of tasks stored in task queues. For example, as illustrated in FIG. 6A, when a difference between the number of tasks (e.g., 6) stored in the first task queue 61 and the number of tasks (e.g., 1) stored in the second task queue 62 is high, that is, when the tasks are concentrated in the first task queue 61, the reference value REF6*a* may have a relatively lower value to distribute the tasks concentrated in the first task queue 61. However, as illustrated in FIG. 6B, when the number of tasks (e.g., 6) stored in the first task queue 61 and the number of tasks (e.g., 1) stored in the second task queue 62 are similar to each other, that is, when the tasks are evenly stored in the first task queue 61 and the second task queue 62, the reference value REF6*b* may have a relatively great value (REF6*b*>REF6*a*) in order to reduce or prevent frequent rescheduling. As described above, the scheduler 22 may monitor the distribution of the tasks stored in the first task queue 61 and the second task queue 62 and may determine the reference value based on the monitored distribution.

Figure 7:
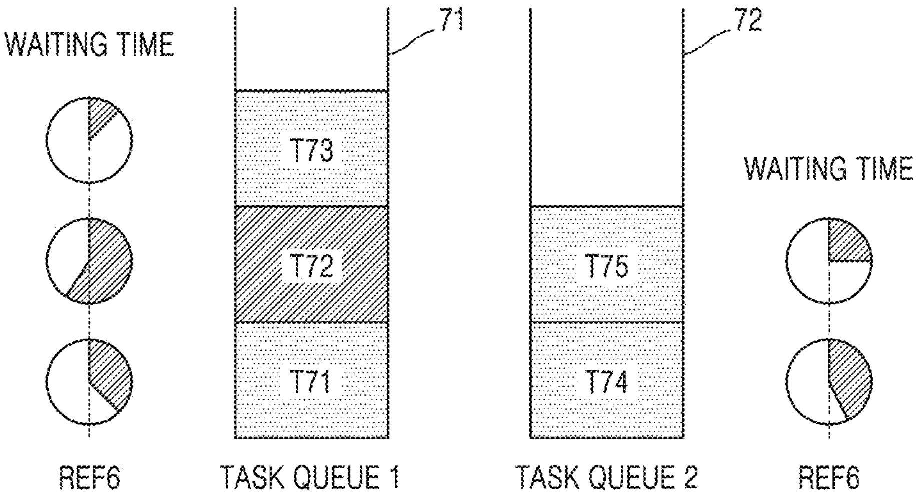
FIG. 7 is a diagram for describing a scheduling assessment according to example embodiments.

FIG. 7 is a diagram for describing a scheduling assessment according to example embodiments. In detail, FIG. 7 illustrates a waiting time of each task stored in a first task queue 71 and each task stored in a second task queue 72.

Referring to FIG. 7, the first task queue 71 may store first through third tasks T71 through T73, and the second task queue 72 may store fourth and fifth tasks T74 and T75. The task may wait in the task queue, when a processing core executes the other tasks or until the other tasks (for example, tasks having higher priority) are executed by the processing core. Thus, each of the tasks stored in the task queue may have a unique waiting time.

In some example embodiments, the scheduler 22 may monitor the waiting time of each of the tasks stored in the task queue and may determine whether or not to execute rescheduling based on the waiting time. For example, as illustrated in FIG. 7, in the first task queue 71, while the waiting time of the first task T71 and the waiting time of the third task T73 may be less than a reference value REF6, the waiting time of the second task T72 may be greater than the reference value REF6. Also, in the second task queue 72, the waiting time of the fourth task T74 and the waiting time of the fifth task T75 may be less than the reference value REF6. Thus, due to the waiting time of the second task T72, which is greater than the reference value REF6, the scheduler may determine to execute rescheduling.

Figure 8:
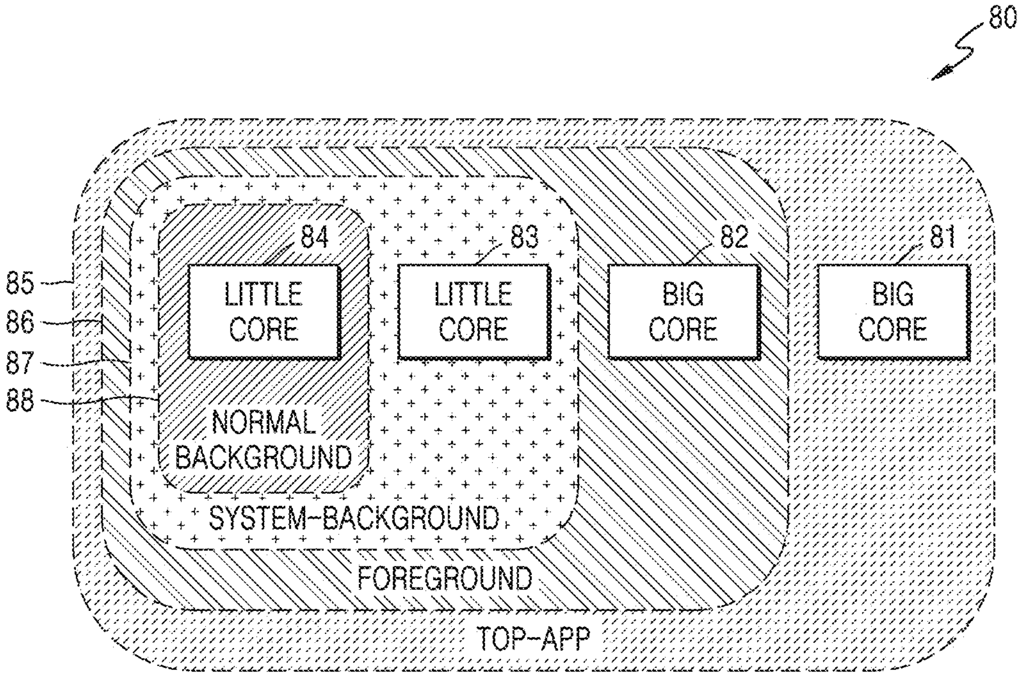
FIG. 8 is a block diagram of a system according to example embodiments.

FIG. 8 is a block diagram of a system 80 according to example embodiments. In detail, the block diagram of FIG. 8 illustrates the system 80 including heterogeneous processing cores and task groups executable by the heterogeneous processing cores.

Referring to FIG. 8, the system 80 may include the processing cores respectively included in two or more core groups. For example, the system 80 may include a first big core 81 and a second big core 82 included in a big core group and a first little core 83 and a second little core 84 included in a little core group. As described above with reference to FIG. 1, while the processing core included in the big core group, that is, a big core, may provide relatively higher performance and/or higher power consumption, the processing core included in the little core group, that is, a little core, may provide relatively lower performance and/or power consumption. In some example embodiments, unlike what is illustrated in FIG. 8, the system 80 may include more than two big cores and/or more than two little cores. Also, in some example embodiments, unlike what is illustrated in FIG. 8, the system 80 may include a single big core and/or a single little core. In some example embodiments, the number of cores in each core group may be partially the same as each other and partially different from each other.

Tasks may be included in one of a plurality of task groups, according to the importance (or a priority). For example, the tasks may be included in one of a top-app group 85 performing an operation for a current display of the system 80, a foreground group 86 performing an operation relevant to the current display of the system 80, and a background group performing an operation irrelevant to the current display of the system 80. Also, the background group may be divided into a normal background group 88 and a system background group 87 performing an operation required for an operation of the system 80.

In some example embodiments, a core for executing the task may be determined according to the importance of the task. For example, as illustrated in FIG. 8, the tasks included in the top-app group 85 having the highest priority may be executed by at least one of the first big core 81, the second big core 82, and the first little core 83, and the second little core 84 and may be preferentially executed by the first big core 81 and the second big core 82. The tasks included in the foreground group 86 may be executed by at least one of the second big core 82, the first little core 83, and the second little core 84. The tasks included in the system background group 87 may be executed by at least one of the first little core 83 and the second little core 84, and the tasks included in the normal background group 88 may be executed by the second little core 84. In some example embodiments, the relationship between the importance of the tasks and the cores executing the tasks may be different from what is described above. In some example embodiments, particular tasks may be executed by other cores despite the relationship between the task groups divided based on the importance and the executing cores for the task groups.

When a plurality of tasks designated to be executed by a processing core in a particular core group approximately simultaneously occur, loads of the processing cores included in one core group may be simultaneously increased. For example, when the plurality of tasks included in the top-app group 85 are simultaneously generated, the tasks may be scheduled in a parallel manner within a very short period of time and may be assigned to the first big core 81 and the second big core 82 included in the big core group. Also, when the plurality of tasks included in the system background group 87 or the normal background group 88 are simultaneously generated, the tasks may be scheduled in a parallel manner within a very short period of time and may be assigned to the first little core 83 and the second little core 84 included in the little core group. As described above, when the plurality of tasks are simultaneously scheduled in the parallel manner, the tasks may not be optimally scheduled because of scheduling operations independent each other. Accordingly, a scheduler may monitor loads of the processing cores, and when loads of all of the processing cores included in the same core group are equal to or greater than a reference value, may determine to execute rescheduling.

Figure 9:
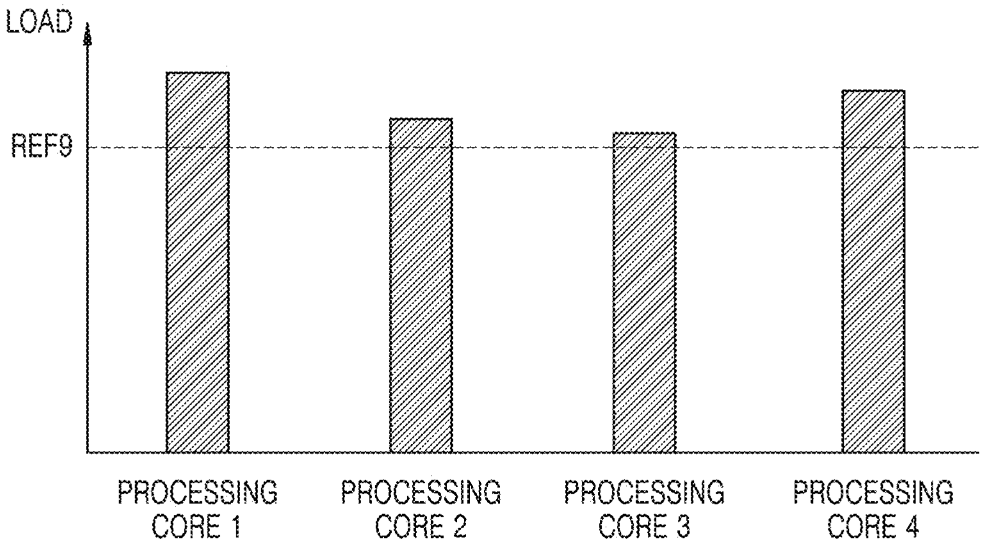
FIG. 9 is a graph for describing a scheduling assessment according to example embodiments.

FIG. 9 is a graph for describing a scheduling assessment according to example embodiments. In detail, the graph of FIG. 9 illustrates loads of first through fourth processing cores.

In some example embodiments, a scheduler may monitor loads of processing cores and may determine whether or not to execute rescheduling based on the loads of all of the processing cores. For example, as illustrated in FIG. 9, when the loads of all of the first through fourth processing cores are greater than a reference value REF9, the improvement of the performance and/or efficiency through the scheduling may be limited. Accordingly, not only in example embodiments in which the loads of all of the processing cores are high as illustrated in FIG. 9, but also in example embodiments in which the loads of the processing cores are gradually decreased from the situation illustrated in FIG. 9, tasks may not be optimally scheduled. Thus, the scheduler may monitor the loads of all of the processing cores, and when the monitored loads of all of the processing cores are equal to or greater than a reference value, may determine to execute the rescheduling. In some example embodiments, the scheduler may determine to execute the rescheduling, also when loads of processing cores of a predetermined or alternatively, desired proportion (for example, six or more processing cores out of total ten processing cores) are equal to or greater than a reference value.

Figure 10:
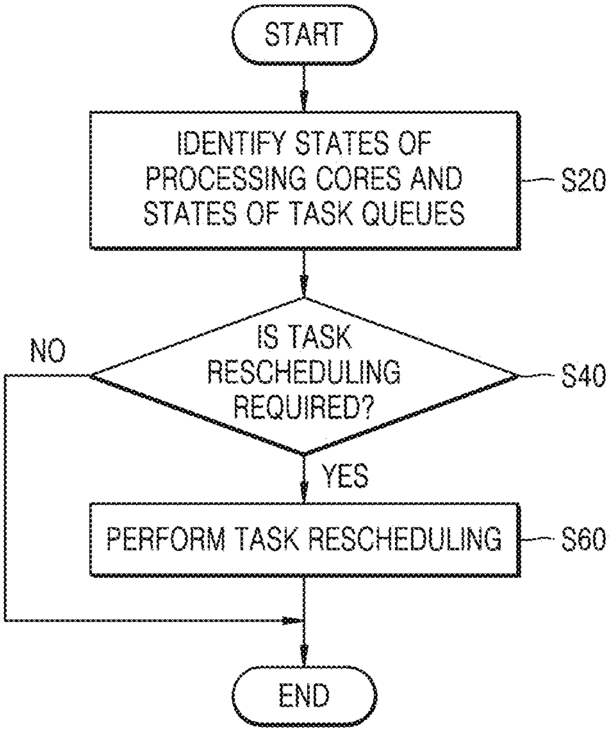
FIG. 10 is a flowchart of a method of task scheduling according to example embodiments.

FIG. 10 is a flowchart of a method of task scheduling according to example embodiments. As illustrated in FIG. 10, the method of task scheduling may include a plurality of operations S20, S40, and S60. In some example embodiments, the method of FIG. 10 may be performed as at least one of the first through Nth processing cores 11_1 through 11_N executes the scheduler SC of FIG. 1, and hereinafter, FIG. 10 is described with reference to FIG. 1.

Referring to FIG. 10, in operation S20, states of processing cores and states of task queues may be identified. In some example embodiments, events generated in the first through Nth processing cores 11_1 through 11_N and events generated in the first through Nth task queues TQ1 through TQN may be recorded. For example, a time point at which a task is stored in a task queue may be recorded, a time point at which a processing core starts to execute the task may be recorded, and a time point at which the processing core finishes executing the task may be recorded. Alternatively, information about loads (or complexities) of tasks assigned to each of the processing cores and/or task queues may be recorded. The scheduler SC may identify states of the first through Nth processing cores 11_1 through 11_N and states of the first through Nth task queues TQ1 through TQN based on the recorded events and/or the recorded loads (or complexities) of the tasks. An example of operation S20 is described below with reference to FIG. 11.

In operation S40, whether or not it is required to reschedule the tasks may be determined. For example, the scheduler SC may determine whether or not it is required to reschedule the tasks stored in the task queues, that is, active tasks, based on the states of the processing cores and the states of the task queues identified in operation S20. In some example embodiments, the scheduler SC may determine to execute the task rescheduling when at least one of various conditions is satisfied, as described above with reference to FIGS. 4A through 9. As illustrated in FIG. 10, when it is determined to execute the task rescheduling, operation S60 may be subsequently performed, but when it is determined that task rescheduling is not required, the method of FIG. 10 may be ended.

When the execution of the task rescheduling is determined, the task rescheduling may be performed in operation S60. For example, to resolve the factor causing the determination of the execution of the task scheduling, the scheduler SC may select an optimal task from among the active tasks and an optimal processing core to execute the selected task (that is, an optimal task queue to store the selected task). An example of operation S60 is described below with reference to FIG. 12.

Figure 11:
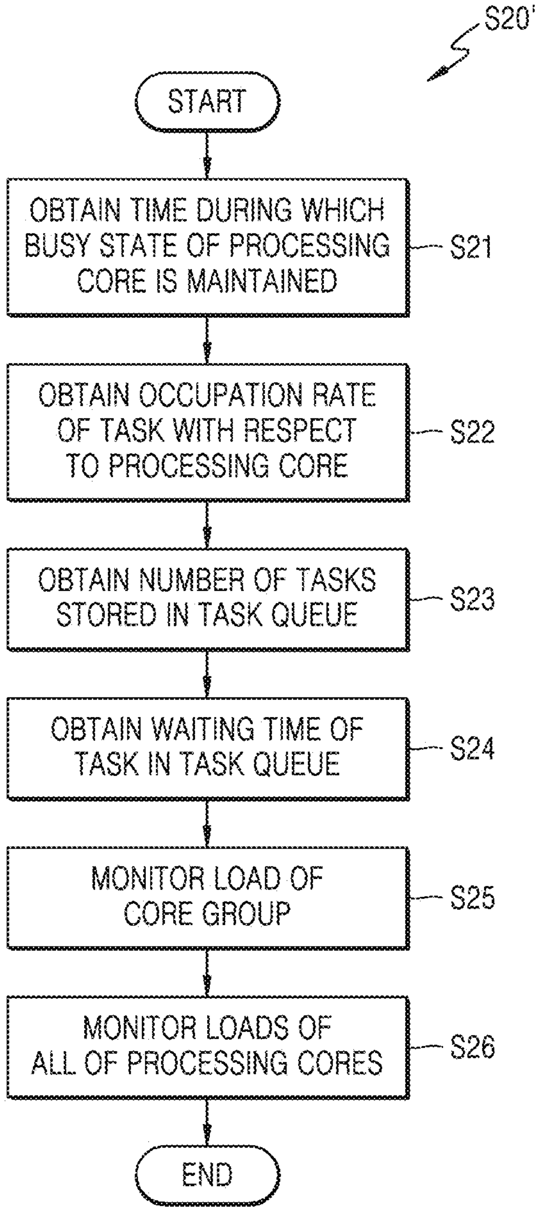
FIG. 11 is a flowchart of a method of task scheduling according to example embodiments.

FIG. 11 is a flowchart of a method of task scheduling according to example embodiments. In detail, the flowchart of FIG. 11 illustrates the example of operation S20 in FIG. 10. As described above with reference to FIG. 10, in operation S20' of FIG. 11, states of processing cores and states of task queues may be identified. As illustrated in FIG. 11, operation S20' may include a plurality of operations S21 through S26. Operations S21 through S26 may be performed in a different order from what is illustrated in FIG. 11, at least two operations from among operations S21 through S26 may be executed in a parallel manner, and at least one of operations S21 through S26 may be omitted. Hereinafter, FIG. 11 is described with reference to FIG. 1.

Referring to FIG. 11, in operation S21, a time during which a busy state of a processing core is maintained may be obtained in operation S21. For example, in order to identify loads of the first through Nth processing cores 11_1 through 11_N, the scheduler SC may obtain a time, that is, a busy time, during which each of the first through Nth processing cores 11_1 through 11_N maintains a busy state (that is, a state in which the processing core executes a task). In some example embodiments, the scheduler SC may collect a time point at which the processing starts an execution of a task and a time point at which the processing ends the execution of the task and may calculate the busy time based on a difference between the collected time points. The scheduler SC may identify the loads of the first through Nth processing cores 11_1 through 11_N based on a ratio of the busy time to a unit time (or a ratio of the busy time to an idle time). As described above with reference to FIGS. 4A and 4B, when the load of the processing core is greater than the reference value, the scheduler SC may determine to execute rescheduling.

In operation S22, an occupation rate of a task with respect to a processing core may be obtained. For example, the scheduler SC may calculate the occupation rate of the task with respect to the processor core based on a time during which the task is executed by the processor. As described above with reference to the drawings, tasks having a relatively higher priority may be executed earlier than tasks having a relatively lower priority, and thus, tasks corresponding to a high occupation rate may be tasks included in a high priority group. As described above with reference to FIG. 5, when a task has an occupation rate greater than a reference value, the scheduler SC may determine to execute the rescheduling.

In operation S23, the number of tasks stored in a task queue may be obtained. For example, the scheduler SC may monitor the first through Nth task queues TQ1 through TQN and may obtain the number of tasks stored in each of the first through Nth task queues TQ1 through TQN. As described above with reference to FIGS. 6A and 6B, when tasks, the number of which is greater than the reference value, are stored in a task queue, the scheduler SC may determine to execute the rescheduling.

In operation S24, a waiting time of a task in a task queue may be obtained. For example, the scheduler SC may monitor the first through Nth task queues TQ1 through TQN and may obtain a waiting time of each of the tasks stored in the first through Nth task queues TQ1 through TQN. In some example embodiments, the scheduler SC may calculate the waiting time of the task based on a time point at which each task is stored in the first through Nth task queues TQ1 through TQN and a current time. As described above with reference to FIG. 7, when a task has a waiting time greater than a reference value, the scheduler SC may determine to execute the rescheduling.

In operation S25, a load of a core group may be monitored. For example, similarly to operation S21, the scheduler SC may obtain a busy time of each of the first through Nth processing cores 11_1 through 11_N in order to identify the loads of the first through Nth processing cores 11_1 through 11_N. When the first through Nth processing cores 11_1 through 11_N include heterogeneous processing cores, the scheduler SC may obtain the busy time of each of the processing cores included in the same core group (for example, a big core group or a little core group) and may monitor the load of the core group based on the obtained busy time. As described above with reference to FIG. 8, when the load of the core group is greater than a reference value, the scheduler SC may determine to execute the rescheduling.

In operation S26, loads of all of the processing cores may be monitored. For example, similarly to operation S21, the scheduler SC may obtain the busy time of each of the first through Nth processing cores 11_1 through 11_N in order to identify the loads of the first through Nth processing cores 11_1 through 11_N. The scheduler SC may monitor the loads of all of the processing cores based on the obtained busy time. As described above with reference to FIG. 9, when the loads of all of the processing cores are greater than the reference value, the scheduler SC may determine to execute the rescheduling.

Figure 12:
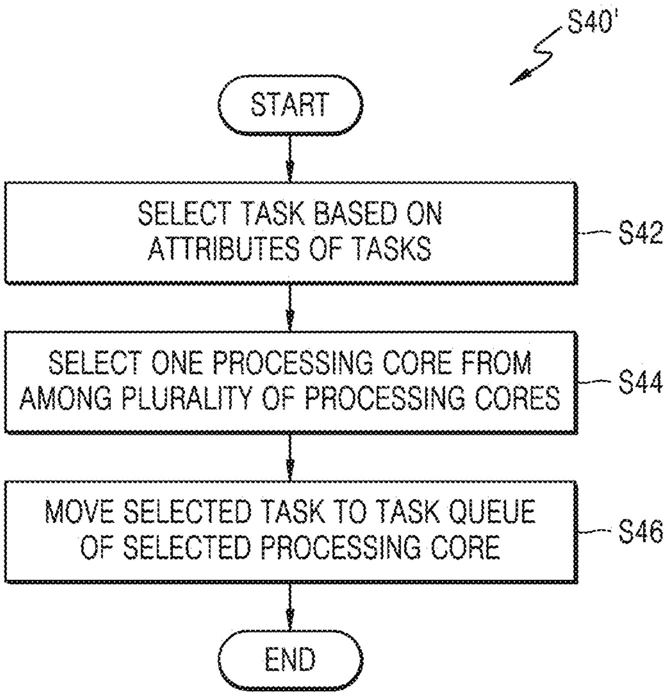
FIG. 12 is a flowchart of a method of task rescheduling according to example embodiments.

FIG. 12 is a flowchart of a method of task rescheduling according to example embodiments. In detail, the flowchart of FIG. 12 illustrates the example of operation S40 in FIG. 10. As described above with reference to FIG. 10, in operation S40' of FIG. 12, whether or not task rescheduling is required may be determined. As illustrated in FIG. 12, operation S40' may include a plurality of operations S42, S44, and S46. Hereinafter, FIG. 12 is described with reference to FIG. 2.

Referring to FIG. 12, a task may be selected based on attributes of tasks in operation S42. For example, as described above with reference to FIG. 2, when it is determined to execute rescheduling, the task selection module 22_2 of the scheduler 22 may select a task to be rescheduled based on attributes of tasks. In some example embodiments, the task selection module 22_2 may select the task based on at least one of the importance of the task, a waiting time of the task in a task queue, and a load (or a complexity) of the task.

In operation S44, one processing core of the plurality of processing cores may be selected. For example, as described above with reference to FIG. 2, the core selection module 22_3 of the scheduler 22 may select the processing core to execute the task selected in operation S42. In some example embodiments, the core selection module 22_3 may select one of the plurality of processing cores based on EAS and/or CFS.

In operation S46, the selected task may be moved to a task queue of the selected processing core. For example, the core selection module 22_3 may identify an area of the memory, in which the processing queue corresponding to the processing core selected in operation S44 is included, and may store the task selected in operation S42 in the identified area. Also, the core selection module 22_3 may remove (or erase) the selected task from the task queue for which the assignment of the task is cancelled due to the rescheduling.

Figure 13:
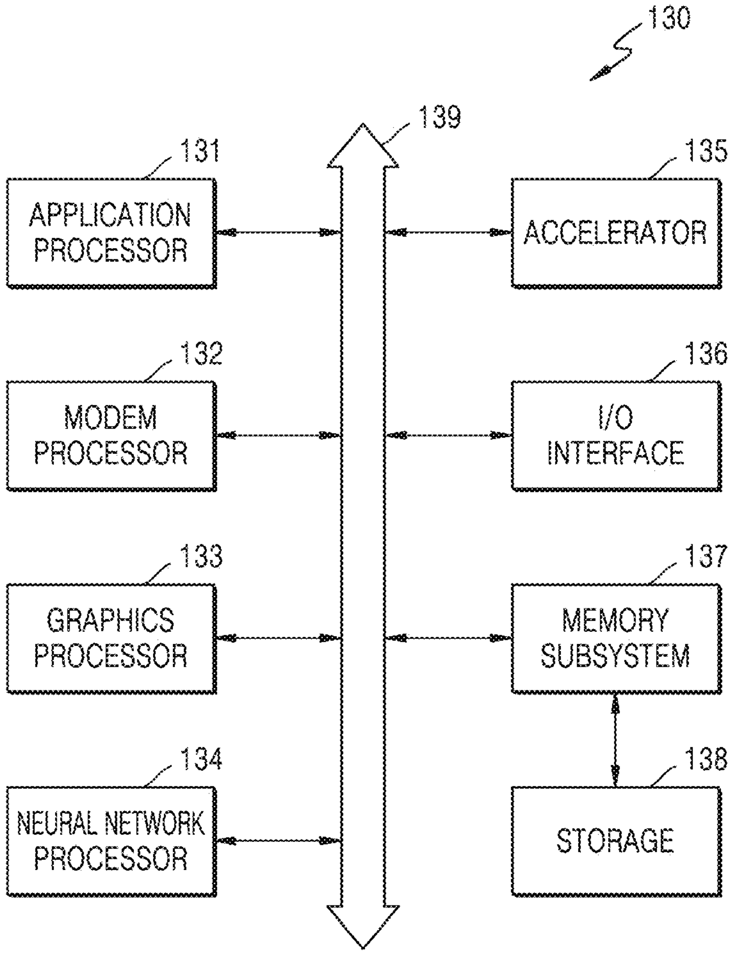
FIG. 13 is a block diagram of a system according to example embodiments.

FIG. 13 is a block diagram of a system 130 according to example embodiments. As illustrated in FIG. 13, the system 130 may include an application processor 131, a modem processor 132, a graphics processor 133, a neural network processor 134, an accelerator 135, an input and output interface 136, a memory sub-system 137, a storage 138, and/or a bus 139. The application processor 131, the modem processor 132, the graphics processor 133, the neural network processor 134, the accelerator 135, the input and output interface 136, the memory sub-system 137, and the storage 138 may communicate with one another via the bus 139. In some example embodiments, the system 130 may be an SoC in which components are implemented in one chip, and the storage 138 may be outside the SoC. In some example embodiments, at least one of the components illustrated in FIG. 13 may be omitted in the system 130.

The application processor 131 may control an operation of the system 130 at an uppermost layer and may control other components of the system 130. The modem processor 132 may demodulate and/or decode a signal received from the outside of the system 130 and may modulate and/or encode a signal generated in the system 130. The graphics processor 133 may execute instructions related to graphics processing and may provide data generated by processing data received from the memory sub-system 137 to the memory sub-system 137. The neural network processor 134 may be designed to process operations based on an artificial neural network at a higher speed and may enable functions based on artificial intelligence (AI).

In some example embodiments, at least one of the application processor 131, the modem processor 132, the graphics processor 133, and the neural network processor 134 may include two or more processing cores. As described above with reference to the drawings, a scheduler may be executed by a processor including two or more processing cores, and the scheduler may execute rescheduling of active tasks. Accordingly, the processor may provide improved performance and/or efficiency, and thus, the performance and/or efficiency of the system 130 may be improved.

The accelerator 135 may be designed to perform designated functions at a higher speed. For example, the accelerator 135 may provide data generated by processing data received from the memory sub-system 137 to the memory sub-system 137. The input and output interface 136 may provide an interface to receive an input from the outside of the system 130 and to provide an output to the outside of the system 130.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The memory sub-system 137 may be accessed by other components connected to the bus 139. In some example embodiments, the memory sub-system 137 may include a volatile memory, such as DRAM and SRAM, and a non-volatile memory, such as a flash memory and RRAM. Also, in some example embodiments, the memory sub-system 137 may provide an interface with respect to the storage 138. The storage 138 may be a storage medium not losing data even when power is blocked. For example, the storage 138 may include a semiconductor memory device, such as a nonvolatile memory, and may include an arbitrary recording medium, such as a magnetic card/disk or an optical card/disk.

While the inventive concepts have been particularly shown and described with reference to example embodiments thereof, it will be understood that various changes in form and details may be made therein without departing from the spirit and scope of the following claims.

What is claimed is:

1. An apparatus comprising:

a plurality of processing cores; and a memory including a plurality of task queues corresponding to the plurality of processing cores, respectively, wherein at least one processing core of the plurality of processing cores is configured, by executing a scheduler, to, determine execution of task rescheduling, based on states of the plurality of processing cores, tasks stored in the plurality of task queues, and a plurality of reference values, the determining including, determining whether a first task queue of the plurality of task queues stores a first task having a waiting time in the first task queue that is equal to or greater than a first reference value of the plurality of reference values, monitoring a distribution of loads of the plurality of processing cores, adjusting a value of a second reference value of the plurality of reference values based on the monitored distribution of loads, the adjusting the value of the second reference value including decreasing or increasing the value of the second reference value in response to a difference of a load of a first processing core of the plurality of processing cores and a load of at least one other processing core of the plurality of processing cores, and determining whether to execute the task rescheduling based on the adjusted second reference value and the waiting time of the first task and a waiting time of at least one other task in at least one other task queue of the plurality of task queues;

in response to the task rescheduling being executed, move the first task stored in the first task queue to a second task queue of the plurality of task queues; and wherein the at least one processing core of the plurality of processing cores is configured to cause execution of the tasks stored in the first task queue by the first processing core of the plurality of processing cores corresponding to the first task queue and the tasks stored in the second task queue by a second processing core of the plurality of processing cores corresponding to the second task queue.

2. The apparatus of claim 1, wherein the at least one processing core is further configured, by executing the scheduler, to, in response to the load of the first processing core corresponding to the first task queue being equal to or greater than the second reference value of the plurality of reference values, determine to execute the task rescheduling.

3. The apparatus of claim 1, wherein the at least one processing core is further configured, by executing the scheduler, to, in response to a second task having an occupation rate that is equal to or greater than a third reference value of the plurality of reference values, with respect to the first processing core corresponding to the first task queue, determine to execute the task rescheduling.

4. The apparatus of claim 1, wherein the at least one processing core is further configured, by executing the scheduler, to, in response to a number of tasks stored in the first task queue being equal to or greater than a fourth reference value of the plurality of reference values, determine to execute the task rescheduling.

5. The apparatus of claim 1, wherein the plurality of processing cores are divided into at least two core groups based on performance; and the at least one processing core is further configured, by executing the scheduler, to, in response to a load of a core group including the first processing core corresponding to the first task queue being equal to or greater than a fifth reference value of the plurality of reference values, determine to execute the task rescheduling.

6. The apparatus of claim 1, wherein the at least one processing core is further configured, by executing the scheduler, to, in response to the loads of all of the plurality of processing cores being equal to or greater than a sixth reference value of the plurality of reference values, determine to execute the task rescheduling.

7. The apparatus of claim 1, wherein the at least one processing core is further configured, by executing the scheduler, to, adjust the value of the plurality of reference values, based on the states of the plurality of processing cores and the tasks stored in the plurality of task queues.

8. The apparatus of claim 1, wherein the at least one processing core is further configured to periodically execute the scheduler.

9. The apparatus of claim 1, wherein the at least one processing core is further configured to execute the scheduler in response to a new task to be executed being generated.

10. The apparatus of claim 1, wherein the at least one processing core is further configured, by executing the scheduler, to, in response to the task rescheduling being executed, select the first task based on attributes of tasks stored in the first task queue.

11. The apparatus of claim 10, wherein the attributes of the tasks include at least one of a task group designated by an upper layer with respect to the scheduler, a task group designated by a layer of the scheduler, the waiting time of the first task, a load, or any combinations thereof.

12. The apparatus of claim 1, wherein the at least one processing core is further configured, by executing the scheduler, to, in response to the task rescheduling being executed, select the second processing core corresponding to the second task queue, from among the plurality of processing cores, based on energy aware scheduling (EAS) and completely fair scheduler (CFS).

13. A method of scheduling tasks performed by an apparatus including a plurality of processing cores, the method comprising:

determining execution of task rescheduling, based on states of the plurality of processing cores and tasks stored in a plurality of task queues corresponding to the plurality of processing cores, respectively, the determining including determining whether a first task queue of the plurality of task queues stores a first task having a waiting time in the first task queue that is equal to or greater than a first reference value, monitoring a distribution of loads of the plurality of processing cores, adjusting a value of a second reference value based on the monitored distribution of loads, the adjusting the value of the second reference value including decreasing or increasing the value of the second reference value in response to a difference of a load of a first processing core of the plurality of processing cores and a load of at least one other processing core of the plurality of processing cores, and determining whether to execute the task rescheduling based on the adjusted second reference value and the waiting time of the first task and a waiting time of at least one other task in at least one other task queue of the plurality of task queues;

executing the task rescheduling, in response to it being determined to execute the task rescheduling, wherein the execution of the task rescheduling includes moving the first task stored in the first task queue to a second task queue of the plurality of task queues; and executing the tasks stored in the first task queue by the first processing core of the plurality of processing cores corresponding to the first task queue and the tasks stored in the second task queue by a second processing core of the plurality of processing cores corresponding to the second task queue.

14. The method of claim 13, wherein the determining of the execution of task rescheduling further includes at least one of:

determining to execute the task rescheduling, in response to the load of the first processing core corresponding to the first task queue being equal to or greater than the second reference value;

determining to execute the task rescheduling, in response to a task having an occupation rate being equal to or greater than a third reference value, with respect to the first processing core corresponding to the first task queue;

determining to execute the task rescheduling, in response to a number of tasks stored in the first task queue being equal to or greater than a fourth reference value;

determining to execute the task rescheduling, in response to the plurality of processing cores being divided into at least two core groups based on performance, and a load of a core group including the first processing core corresponding to the first task queue is equal to or greater than a fifth reference value; and determining to execute the task rescheduling, in response to the loads of all of the plurality of processing cores being equal to or greater than a sixth reference value.

15. The method of claim 13, wherein the execution of the task rescheduling further includes selecting the first task based on attributes of tasks stored in the first task queue; and the attributes of the tasks include at least one of a task group designated by an upper layer with respect to the scheduler, a task group designated by a layer of the scheduler, the waiting time of the first task, a load, or any combinations thereof.

16. The method of claim 13, wherein the execution of the task rescheduling further includes selecting the second processing core corresponding to the second task queue, from among the plurality of processing cores, based on energy aware scheduling (EAS) and completely fair scheduler (CFS).

17. A non-transitory computer-readable storage medium storing computer readable instructions that, when executed by at least one processing core of a plurality of processing cores, cause the at least one processing core to execute task scheduling, wherein the task scheduling comprises:

determining execution of task rescheduling based on states of the plurality of processing cores and tasks stored in a plurality of task queues corresponding to the plurality of processing cores, respectively, the determining including determining whether a first task queue of the plurality of task queues stores a first task having a waiting time in the first task queue that is equal to or greater than a first reference value, monitoring a distribution of loads of the plurality of processing cores, adjusting a value of a second reference value based on the monitored distribution of loads, the adjusting the value of the second reference value including decreasing or increasing the value of the second reference value in response to a difference of a load of a first processing core of the plurality of processing cores and a load of at least one other processing core of the plurality of processing cores, and determining whether to execute the task rescheduling based on the adjusted second reference value and the waiting time of the first task and a waiting time of at least one other task in at least one other task queue of the plurality of task queues;

executing the task rescheduling, in response to it being determined to execute the task rescheduling, wherein the execution of the task rescheduling includes moving the first task stored in the first task queue to a second task queue; and causing execution of the tasks stored in the first task queue by the first processing core of the plurality of processing cores corresponding to the first task queue and the tasks stored in the second task queue by a second processing core of the plurality of processing cores corresponding to the second task queue.

18. The non-transitory computer-readable storage medium of claim 17, wherein the determining of the execution of task rescheduling further includes at least one of:

determining to execute the task rescheduling, in response to the load of the first processing core corresponding to the first task queue being equal to or greater than the second reference value;

determining to execute the task rescheduling, in response to there being a task having an occupation rate that is equal to or greater than a third reference value, with respect to the first processing core corresponding to the first task queue;

determining to execute the task rescheduling, in response to a number of tasks stored in the first task queue being equal to or greater than a fourth reference value;

determining to execute the task rescheduling, in response to the plurality of processing cores being divided into at least two core groups based on performance, and a load of a core group including the first processing core corresponding to the first task queue being equal to or greater than a fifth reference value; and determining to execute the task rescheduling, in response to the loads of all of the plurality of processing cores being equal to or greater than a sixth reference value.

19. The non-transitory computer-readable storage medium of claim 17, wherein the execution of the task rescheduling includes:

selecting the first task based on attributes of tasks stored in the first task queue; and selecting the second processing core corresponding to the second task queue, from among the plurality of processing cores, based on at least one of energy aware scheduling (EAS) and completely fair scheduler (CFS).

20. The non-transitory computer-readable storage medium of claim 17, wherein the execution of the task rescheduling includes, executing a scheduler in response to a new task to be executed being generated.

* * * * *